US011394026B2

(12) United States Patent
Kern et al.

(10) Patent No.: US 11,394,026 B2
(45) Date of Patent: Jul. 19, 2022

(54) PROCESS FOR MAKING AN ELECTRODE ACTIVE MATERIAL

(71) Applicant: BASF SE, Ludwigshafen am Rhein (DE)

(72) Inventors: Andreas Michael Kern, Ludwigshafen (DE); Lothar Seidemann, Ludwigshafen (DE); Christoph Erk, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/616,280

(22) PCT Filed: May 16, 2018

(86) PCT No.: PCT/EP2018/062660
§ 371 (c)(1),
(2) Date: Nov. 22, 2019

(87) PCT Pub. No.: WO2018/215254
PCT Pub. Date: Nov. 29, 2018

(65) Prior Publication Data
US 2020/0144617 A1   May 7, 2020

(30) Foreign Application Priority Data

May 24, 2017   (EP) .................................... 17172831

(51) Int. Cl.
*H01M 4/525* (2010.01)
*C01G 53/00* (2006.01)
*H01M 4/505* (2010.01)
*H01M 10/0525* (2010.01)

(52) U.S. Cl.
CPC ............ *H01M 4/525* (2013.01); *C01G 53/42* (2013.01); *C01G 53/50* (2013.01); *H01M 4/505* (2013.01); *H01M 10/0525* (2013.01); *C01P 2006/40* (2013.01)

(58) Field of Classification Search
CPC .................................................... H01M 4/525
See application file for complete search history.

(56) References Cited

U.S. PATENT DOCUMENTS

| 8,663,849 | B2 * | 3/2014 | Venkatachalam | ..... | H01M 4/582 |
| | | | | | 429/231.95 |
| 9,236,604 | B2 | 1/2016 | Ikeda et al. | | |
| 2006/0239883 | A1 | 10/2006 | Kang et al. | | |
| 2015/0056511 | A1 * | 2/2015 | Takamatsu | .............. | H01M 4/36 |
| | | | | | 429/221 |
| 2015/0093646 | A1 | 4/2015 | Kawada | | |

FOREIGN PATENT DOCUMENTS

| CN | 102810667 A | 12/2012 |
| CN | 103956456 A | 7/2014 |
| EP | 3467914 A1 | 4/2019 |
| JP | 2002-216759 A | 8/2002 |
| JP | 2008-44836 A | 2/2008 |

OTHER PUBLICATIONS

International Search Report dated Jul. 13, 2020 in PCT/EP2018/062660, 4 pages.
Extended European Search Report dated Jul. 31, 2017 in European Patent Application No. 17172831.4, 3 pages.
Senthil Kumar, P., et al., "Synthesis of layered Li(Ni$_{1/3}$ Co$_{1/3}$ Mn$_{1/3}$ )O$_2$ cathode via CTAB assisted ball milling route", International Journal of Science and Engineering Applications, Retrieved from the internet: URL: https://www.researchgate.net/profile/Senthil_Kumar_Parthasarathi/publication/303912350_Synthesis_of_layered_LiNi13Co13Mn1302_cathode_via_CTAB_assisted_ball_milling_route/links/57cee2508aed88462133ecd/Synthesis-of-layered-LiNi1-3Co1-3Mn1-302-cathode-via-CTAB-assisted-ball-milling-route.pdf , retrieved on Jul. 20, 2017, pp. 23-25.
Trivedi, Mahendra Kumar, et al. "Characterization of physical and structural properties of brass powder after biofield treatment." *Powder Metallurgy & Mining* 4.1 (2015).

\* cited by examiner

*Primary Examiner* — William D Young
(74) *Attorney, Agent, or Firm* — Finnegan, Henderson, Farabow, Garrett & Dunner, LLP

(57) ABSTRACT

Process for making an electrode active material for a lithium ion battery, said process comprising the following steps: (a) Contacting a mixture of (A) a precursor of a mixed oxide according to general formula $Li_{1+x}TM_{1-x}O_2$, wherein TM is a combination of two or more transition metals selected from Mn, Co and Ni, optionally in combination with at least one more metal selected from Ba, Al, Ti, Zr, W, Fe, Cr, K, Mo, Nb, Mg, Na and V, and x is in the range of from zero to 0.2, and (B) at least one lithium compound, with (C) Br$_2$, I$_2$, or at least one compound selected from carbon perhalides selected from the bromides and iodides, and interhalogen compounds comprising bromine or iodine, and (b) Subjecting said mixture to heat treatment at a temperature in the range of from 700 to 1000° C.

10 Claims, No Drawings

PROCESS FOR MAKING AN ELECTRODE ACTIVE MATERIAL

The present invention is directed towards a process for making an electrode active material for a lithium ion battery, said process comprising the following steps:

(a) Contacting a mixture of
  (A) a precursor of a mixed oxide according to general formula $Li_{1+x}TM_{1-x}O_2$, wherein TM is a combination of two or more transition metals selected from Mn, Co and Ni, optionally in combination with at least one more metal selected from Ba, Al, Ti, Zr, W, Fe, Cr, K, Mo, Nb, Mg, Na and V, and x is in the range of from zero to 0.2,
  (B) and at least one lithium compound, with
  (C) $Br_2$, $I_2$, or at least one compound selected from carbon perhalides selected from the bromides and iodides, and interhalogen compounds comprising bromine or iodine,
(b) Subjecting said mixture to heat treatment at a temperature in the range of from 700 to 1000° C.

Lithiated transition metal oxides are currently being used as electrode active materials for lithium-ion batteries. Extensive research and developmental work has been performed in the past years to improve properties like charge density, specific energy, but also other properties like the reduced cycle life and capacity loss that may adversely affect the lifetime or applicability of a lithium-ion battery. Additional effort has been made to improve manufacturing methods.

In a typical process for making cathode materials for lithium-ion batteries, first a so-called precursor is being formed by co-precipitating the transition metals as carbonates, oxides or preferably as hydroxides that may or may not be basic. The precursor is then mixed with a lithium salt such as, but not limited to LiOH, $Li_2O$ or—especially—$Li_2CO_3$—and calcined (fired) at high temperatures. Lithium salt(s) can be employed as hydrate(s) or in dehydrated form. The calcination—or firing—generally also referred to as thermal treatment or heat treatment of the precursor—is usually carried out at temperatures in the range of from 600 to 1,000° C. During the thermal treatment a solid state reaction takes place, and the electrode active material is formed. The thermal treatment is performed in the heating zone of an oven or kiln.

Electrode active materials are used as powders. The particles should have an average diameter in the range of from 2 to 15 µm, preferably 3 to 12 µm. Depending on the conditions and some circumstances that are hard to control freshly synthesized electrode active material may contain fines and lumps and aggregates. Lumps and aggregates are usually undesirable because they have a negative impact on the subsequent cell production process, in terms of flowability of the cathode active material, its tap density many others. Hence, extra efforts for de-agglomeration of the lumps or their removal are necessary. It is therefore an objective of the present invention to provide a process that furnishes an electrode active material for lithium ion batteries with excellent morphology and in particular with very few lumps, or even with no lumps at all.

Accordingly, the process defined at the outset has been found, hereinafter also referred to as inventive process or process according to the present invention.

The inventive process comprises the following steps, hereinafter also referred to as steps (a) and (b):

(a) Contacting a mixture of
  (A) a precursor of a mixed oxide according to general formula $Li_{1+x}TM_{1-x}O_2$, wherein TM is a combination of two or more transition metals selected from Mn, Co and Ni, optionally in combination with at least one more metal selected from Ba, Al, Ti, Zr, W, Fe, Cr, K, Mo, Nb, Mg, Na and V, and x is in the range of from zero to 0.2, said precursor also being referred to as precursor (A), and
  (B) at least one lithium compound, hereinafter also referred to as lithium compound (B) or as lithium salt (B), with
  (C) $Br_2$, $I_2$, or at least one compound selected from carbon perhalides selected from the bromides and iodides, and interhalogen compounds comprising bromine or iodine,
(b) Subjecting said mixture to heat treatment at a temperature in the range of from 700 to 1000° C.

Steps (a) and (b) and (c) will be described in more detail below.

The inventive process refers to a process of making a mixed oxide according to general formula $Li_{1+x}TM_{1-x}O_2$ wherein TM is a combination of two or more transition metals selected from Mn, Co and Ni, optionally in combination with at least one more metal selected from Ba, Al, Ti, Zr, W, Fe, Cr, Mo, Nb, Mg, and V, and x is in the range of from zero to 0.2, preferably 0.001 to 0.1 and even more preferably from 0.002 to 0.05.

TM may be selected from combinations of Mn and Co, or Mn and Ni, and Ni and Co, and from combinations of Ni, Mn and Co, optionally in each case at least one more metal selected from Ba, Al, Ti, Zr, W, Fe, Cr, Mo, Nb, Mg, and V, preferably at least one of Al, W, Ti and Zr. Preferred are combinations of Ni and Co and of Ni and Co and Mn, optionally in each case at least one more metal selected from Al, W, Ti and Zr.

In a preferred embodiment, TM is a combination of metals according to general formula (I)

$$(Ni_aCo_bMn_c)_{1-d}M_d \qquad (I)$$

with
a being in the range of from 0.3 to 0.95, preferably 0.6 to 0.9, and even more preferably 0.6 to 0.85,
b being in the range of from 0.05 to 0.4, preferably 0.05 to 0.2,
c being in the range of from zero to 0.6, preferably zero to 0.2, and
d being in the range of from zero to 0.1, preferably 0.001 to 0.005,
d being in the range of from zero to 0.1, and $a+b+c=1$.

M is selected from Ba, Al, Ti, Zr, W, Fe, Cr, Mo, Nb, Mg, and V, including combinations of at least two of the foregoing, preferably M is selected from Al, W, Ti and Zr and combinations of at least two of the foregoing, and even more preferably from Al, Ti and Zr.

Examples of combinations of metals according to general formula (I) are selected from $Ni_{0.33}Co_{0.33}Mn_{0.33}$, $Ni_{0.4}Co_{0.2}Mn_{0.4}$, $Ni_{0.5}Co_{0.2}Mn_{0.3}$, $Ni_{0.6}Co_{0.2}Mn_{0.2}$, $(Ni_{0.85}Co_{0.15})_{0.98}Al_{0.02}$, $(Ni_{0.85}Co_{0.15})_{0.97}Al_{0.03}$, $(Ni_{0.85}Co_{0.15})_{0.95}Al_{0.05}$, $Ni_{0.8}Co_{0.1}Mn_{0.1}$, and $Ni_{0.7}Co_{0.2}Mn_{0.1}$. Further examples are $(Ni_{0.6}Co_{0.2}Mn_{0.2})_{0.997}Al_{0.003}$, $(Ni_{0.6}Co_{0.2}Mn_{0.2})_{0.998}Al_{0.002}$, $(Ni_{0.7}Co_{0.2}Mn_{0.1})_{0.997}Al_{0.003}$, $(Ni_{0.7}Co_{0.2}Mn_{0.1})_{0.998}Al_{0.002}$, $(Ni_{0.8}Co_{0.1}Mn_{0.1})_{0.997}Al_{0.003}$, $(Ni_{0.8}Co_{0.1}Mn_{0.1})_{0.998}Al_{0.002}$.

Said TM may contain traces of metal ions, for example traces of ubiquitous metals such as sodium, calcium or zinc, as impurities but such traces will not be taken into account in the description of the present invention. Traces in this context will mean amounts of 0.05 mol-% or less, referring to the total metal content of TM.

It is possible to synthesize the desired electrode active material from a lithium compound (B) and a mixture of oxides or hydroxides or carbonates of TM. However, it is preferred to synthesize said mixed oxide from a mixture of at least one lithium compound (B) and a mixed carbonate, mixed oxide, mixed hydroxide or mixed oxyhydroxide of TM. Mixed oxide, mixed hydroxide and mixed oxyhydroxide of TM are even more preferred as precursor (A).

Precursors (A) may be selected from mixtures of metal oxides, metal carbonates or—preferably—from mixed metal hydroxides or—more preferably—mixed oxyhydroxides.

In one embodiment of the present invention, the mean particle diameter (D50) of precursor (A) is in the range of from 6 to 12 μm, preferably 7 to 10 μm. The mean particle diameter (D50) in the context of the present invention refers to the median of the volume-based particle diameter, as can be determined, for example, by light scattering.

In one embodiment of the present invention, precursor (A) has the same composition of TM as the desired electrode active material.

In another embodiment of the present invention, precursor (A) has a different composition of TM. For example, the ratio of the two or more transition metals selected from Mn, Co and Ni is the same as in the desired electrode active material but element M is missing.

Lithium compound (B) is selected from lithium salts. Preferably, lithium compound (B) is selected from lithium hydroxide, lithium oxide, lithium nitrate, lithium acetate and lithium carbonate, each as such or as hydrate. Preferred are $LiOH$, $LiOH.H_2O$ and $Li_2CO_3$.

In embodiments wherein TM in the precursor is the same as in the desired electrode active material, the molar ratio of TM in precursor (A) to lithium in lithium compound (B) is selected approximately in the desired range of the desired compound, for example in the range of 1:(1+x).

Said mixture of precursor (A) and lithium compound (B) may be made in a sub-step before step (a) or together with step (a).

In step (a), such mixture of precursor (A) and lithium compound (B) is contacted with $Br_2$, $I_2$, or at least one compound selected from carbon perhalides selected from the bromides and iodides, and interhalogen compounds comprising bromine or iodine. In the context of the present invention, $Br_2$, $I_2$, compounds selected from carbon perhalides selected from the bromides and iodides, and interhalogen compounds comprising bromine or iodine are abbreviated as (C).

Examples of carbon perhalides selected from the bromides and iodides are $CBr_4$, $CI_4$ (carbon tetraiodide), $C_2Br_6$, $C_2I_6$, and $C_2Br_4$ (tetrabromoethylene). Preferred examples of interhalogen compounds comprising bromine or iodine are Br—F, I—F, Br—$Cl_1$, I—Cl, Br—I, $ICl_3$, and $IBr_3$.

In step (a), it is more preferred to contact said mixture with bromine, $Br_2$, and it is even more preferred to contact said mixture with iodine, $I_2$.

In one embodiment of the present invention, in step (a) said mixture is contacted with a mixture of bromine and iodine, or with a mixture of bromine and at least one interhalogen compound comprising bromine or iodine, or with a mixture of iodine and at least one interhalogen compound comprising bromine or iodine, or with a mixture of a carbon perhalide and bromine, or with a mixture of a carbon perhalide and iodine.

In one embodiment of the present invention, molar ratio of Br or I, respectively, to TM in said precursor is in the range of from 10 ppb to 0.2, preferably 1 ppm to 0.1. A molar ratio of Br to TM of 0.2 in step (a) means that per mole of TM 0.2 moles of Br are applied which translates to 0.1 moles of $Br_2$.

Step (a) may be performed in the presence of a solvent, or in bulk. Examples of solvents are organic solvents, such as chlorinated hydrocarbons, for example dichloromethane and chloroform. Non-chlorinated solvents such as amides, alcohols, ketones, and mixtures therefrom are preferred. Examples of suitable non-chlorinated amides are N,N-dimethylformamide ("DMF") and N—$C_1$-$C_6$-alkyl-pyrrolidones such as N-methyl-2-pyrrolidone ("NMP") and N-ethyl-2-pyrrolidone ("NEP"). Examples of suitable non-chlorinated alcohols are methanol, ethanol, isopropanol, ethylene glycol, and propane-1,2-diol. Examples of suitable ketones are acetone, methyl ethyl ketone ("MEK"), and methyl isobutyl ketone ("MIBK"). It is preferred to select solvents with a boiling point of 150° C. or less at normal pressure for the sake of easier removal of the solvent, preferred are 100° C. or less. Examples of particularly suitable mixtures of non-chlorinated organic solvents are mixtures from ethanol and MEK and mixtures from isopropanol and MEK.

Solvents used in step (a) of the inventive process may be used in technical quality or after removal of water. Minor amounts such as 0.01 to 5% by weight of water in a solvent are, however, generally not critical for step (a).

In embodiments of step (a) in which a solution of $Br_2$, $I_2$, or of at least one compound selected from carbon perhalides selected from the bromides and iodides, and of interhalogen compounds comprising bromine or iodine is applied, the concentration of the respective halogen or halide may be in the range of from 0.1 to 5 mol/l solvent at ambient temperature.

Step (a) may be performed at ambient temperature. In other embodiments, step (a) is performed at a temperature in the range of from zero to 180° C.

Step (a) may be performed at a pressure in the range of from 10 mbar to 10 bar. Normal pressure (1 atm) is preferred.

The duration of step (a) may be in the range of from one minute to 5 hours, preferred are 5 to 60 minutes.

In one embodiment of the present invention, step (a) is performed by charging a vessel with precursor (A), and then adding $Br_2$, $I_2$, or at least one compound selected from exhaustively halogenated hydrocarbons, hereinafter also referred to as carbon perhalides being selected from the respective bromides and iodides, and from interhalogen compounds comprising bromine or iodine, with or without solvent, and lithium compound (B).

In another embodiment of the present invention, step (a) is performed by charging a vessel with a mixture from precursor (A) and lithium compound (B), and then adding $Br_2$, $I_2$, or at least one compound selected from carbon perhalides selected from the bromides and iodides, and interhalogen compounds comprising bromine or iodine, with or without solvent.

In yet another embodiment of the present invention, step (a) is performed by making a mixture of from precursor (A) and lithium compound (B), and then adding $Br_2$, $I_2$, or at least one compound selected from carbon perhalides selected from the bromides and iodides, and interhalogen compounds comprising bromine or iodine, with or without solvent, and moving such mixture through a kiln, for example through a tunnel kiln, for example a rotary hearth kiln, or through a rotary kiln or through a pendulum kiln, or through a fluidized bed or a vertical shaft furnace.

In embodiments wherein a doping is applied and wherein said doping element is not yet included in the precursor it is preferred to add a compound of said doping element M, hereinafter also referred to as compound (D), before or during step (a). Suitable examples of compounds (D) are oxides, oxyhydroxides and hydroxides of aluminum, titanium, or zirconium, such as $TiO_2$, $TiO_2$.aq, $TiO(OH)_2$, $ZrO_2$, $ZrO_2$.aq, $ZrO(OH)_2$, $Al_2O_3$, $Al_2O_3$.aq, AlOOH, and $Al(OH)_3$.

In embodiments in which a solution of (C) is contacted with a mixture from precursor (A) and lithium compound (B), a slurry or a paste may result in the first instance, depending on the amount of solvent. In embodiments wherein a slurry is obtained, the contacting may further be enhanced by stirring.

In one embodiment of the present invention, a mixture of precursor (A) and lithium compound (B) is treated with a solution of (C) in an organic solvent or a combination of at least two organic solvents followed by removal of the organic solvent(s).

Without wishing to be bound by any theory, it is believed that some (C) undergoes a chemical reaction with precursor (A) while some (C) remains unreacted.

In step (b) of the inventive process, said mixture is subjected to heat treatment at a temperature in the range of from 700 to 1000° C., preferably 750 to 900° C.

In one embodiment of the present invention, the mixture of precursor (A) and lithium compound (B) and residual (C) and, optionally, solvent(s), is heated to 700 to 1000° C. with a heating rate of 0.1 to 10° C./min.

In one embodiment of the present invention, the temperature is ramped up before reaching the desired temperature of from 700 to 1000° C., preferably 750 to 900° C. For example, first the mixture of precursor (A) and lithium compound (B) and residual (C) and, optionally, solvent(s), is heated to a temperature in the range of from 100 to 150° C. and then held constant for a time of 10 min to 4 hours, then the temperature is ramped up to 350 to 550° C. and then held constant for a time of 10 min to 4 hours, and then it is raised to 700° C. up to 1000° C.

In embodiments wherein in step (a) at least one solvent has been used, as part of step (b), or separately and before commencing step (b), such solvent(s) are removed, for example by filtration, evaporation or distilling of such solvent(s). Preferred are evaporation and distillation.

In one embodiment of the present invention, step (b) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, step (b) is performed in an oxygen-containing atmosphere, for example in a nitrogen-air mixture, in a rare gas-oxygen mixture, in air, in oxygen or in oxygen-enriched air. In a preferred embodiment, the atmosphere in step (b) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen.

In one embodiment of the present invention, step (b) of the present invention is performed under a stream of gas, for example air, oxygen and oxygen-enriched air. Such stream of gas may be termed a forced gas flow. Such stream of gas may have a specific flow rate in the range of from 0.5 to 15 m³/h·kg material according to general formula $Li_{1+x}TM_{1-x}O_2$. The volume is determined under normal conditions: 273.15 Kelvin and 1 atmosphere. Said stream of gas is useful for removal of gaseous cleavage products such as water and carbon dioxide.

The inventive process may include further steps such as, but not limited, additional calcination steps at a temperature in the range of from 800 to 1000° C. subsequently to step (b).

After thermal treatment in accordance to step (b), the cathode active material so obtained is cooled down before further processing.

By performing the inventive process, electrode active materials with an excellent morphology are obtained. They are free from undesired agglomerates and lumps, and they exhibit—depending on the particle diameter distribution of the respective precursor (A), a narrow particle diameter distribution, excellent processability as well as electrochemical performance such as specific capacity or capacity retention upon cycling.

A further aspect of the present invention relates to an electrode active material, hereinafter also referred to as inventive electrode active material. Inventive electrode active materials comprise a mixed oxide according to general formula $Li_{1+x}TM_{1-x}O_2$, wherein TM is a combination of two or more transition metals selected from Mn, Co and Ni, optionally in combination with at least one more metal selected from Ba, Al, Ti, Zr, W, Fe, Cr, K, Mo, Nb, Mg, Na and V, and x is in the range of from zero to 0.2, and bromine or iodine in the range of from 0.01 to 1.0%, and a diameter (D99) in the range of from 30 to 40 μm. Such material is obtainable according to the inventive process. No sieving or milling steps are necessary.

In a preferred embodiment, TM is a combination of metals according to general formula (I)

$$(Ni_aCo_bMn_c)_{1-d}M_d \quad (I)$$

with a being in the range of from 0.3 to 0.95, preferably 0.6 to 0.9, and even more preferably 0.6 to 0.85, b being in the range of from 0.05 to 0.4, preferably 0.05 to 0.2, c being in the range of from zero to 0.6, preferably zero to 0.2, and d being in the range of from zero to 0.1, preferably 0.001 to 0.005, d being in the range of from zero to 0.1, and $$a+b+c=1.$$

M is selected from Ba, Al, Ti, Zr, W, Fe, Cr, Mo, Nb, Mg, and V, including combinations of at least two of the foregoing, preferably M is selected from Al, W, Ti and Zr and combinations of at least two of the foregoing, and even more preferably from Al, Ti and Zr.

Without wishing to be bound by any theory it is believed that Br or I in inventive electrode active materials are in an oxidation state of at least +III, for example $LiIO_3$.

A further aspect of the present invention refers to electrodes comprising at least one electrode material active according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

Cathodes according to the present invention can comprise further components. They can comprise a current collector, such as, but not limited to, an aluminum foil. They can further comprise conductive carbon and a binder.

Suitable binders are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have an average molecular weight $M_w$ in the range from 50,000 to 1,000,000 g/mol, preferably to 500,000 g/mol.

Binder may be cross-linked or non-cross-linked (co)polymers.

In a particularly preferred embodiment of the present invention, binder is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and are preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (III) and (IV)

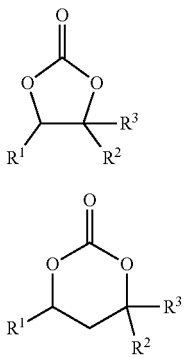

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tertbutyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (V).

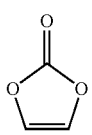

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to $-10°$ C. or even less), a very good discharge and cycling behavior, in particular at high temperatures (45° C. or higher, for example up to 60° C.) in particular with respect to the capacity loss, and a good safety behavior at high temperatures such as 60° C. or more. Preferably, also the cycle stability and the C-rate capacity behavior are improved, or they are at least identical although the Li content is lower.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The invention is further illustrated by working examples.

General remark: Nl—liters at normal conditions/atm, 20° C.

Precursor (A.1): $Ni_{0.9}Co_{0.1}(OH)_2$, average particle diameter (D50): 10 µm, made by co-precipitation from $NiSO_4$/$CoSO_4$-solution with aqueous NaOH solution in the presence of ammonia.

Precursor (A.2): $Ni_{0.8}Co_{0.1}Mn_{0.1}(OH)_2$, partially oxidized, average particle diameter (D50): 10 µm, made by co-precipitation from $NiSO_4$/$CoSO_4$/$MnSO_4$-solution with aqueous NaOH solution in the presence of ammonia.

Lithium compound (B.1): $LiOH·H_2O$, average particle diameter (D50): 9 µm

EXAMPLE 1

An amount of 16.95 g of precursor (A.1) and 8.05 g (B.1) were mixed. The molar ratio of TM/Li was 1:1.015.

An amount of 2.5 g of 12 (99.8% purity) were dissolved in 50 ml of ethanol, (technical grade: 6.5% by vol water.

Step (a.1): A 100-ml-beaker from polyethylene was charged with the above solution of iodine. Then, the mixture of precursor (A.1) and lithium compound (B.1) was added and agitated. Then, the solvents were evaporated at ambient temperature until loose agglomerates of slightly moist powder remained.

The slightly moist powder so obtained was then transferred into a metal rotary bulb (Ni-alloy) and external heating by an electrical split tube furnace was commenced. A constant stream of air with a flow rate of 60 Nl/h was applied.

Within 10 minutes, the temperature in the bulb reached 200° C. For the next 15 minutes, the temperature was maintained at ca. 210° C. Evaporation of residual solvent and removal of unreacted iodine could be observed.

Step (b.1): Then, the powder was heated to 710° C. within 70 minutes and then maintained at that temperature for 60 minutes, followed by rapid cooling in air of ambient temperature by means of opening the split tube furnace. After 1 hour of cooling, the temperature dropped to 70° C.

An electrode active material of general formula $Li_{(1+x)}(Ni_{0.9}Co_{0.1})_{(1-x)}O_2$ was obtained. The iodine content was 0.5% by weight, determined by coulometric titration. The average particle diameter (D50) of 10 µm and a diameter (D99) of 32 µm. It had excellent morphology with no lumps or aggregated particles of more than 15 µm particle diameter. Electrochemical data were excellent.

Comparison Experiment:

A mixture of 33.90 g of (A.1) and 16.1 g of (B.1) were mixed without performing a step (a). The mixture so obtained was placed in the above described rotary bulb. A constant stream of pure oxygen with a flow rate of 60 Nl/h was applied. The temperature was ramped up from room conditions to 700° C. within 140 min and maintained for 60 min. Cooling of the sample to 60° C. took place with an exponential decay within 150 min.

An comparison electrode active material of general formula $Li_{(1+x)}(Ni_{0.9}Co_{0.1})_{(1-x)}O_2$ was obtained. However, more than 50% of the sample was agglomerated to massive lumps of 1-5 mm diameter.

EXAMPLE 2

An amount of 35.35 g of precursor (A.2) and 14.65 g (B.1) were mixed. The molar ratio of TM/Li was 1.1.03.

An amount of 0.23 g of I2 (99.8% purity) were dissolved in 50 ml of ethanol (95% purity)

Step (a.2): A 100-ml-beaker from polyethylene was charged with the above solution of iodine.

Then, the mixture of precursor (A.2) and lithium compound (B.1) was added and agitated. Then, the solvents were evaporated at ambient temperature until loose agglomerates of slightly moist powder remained.

The slightly moist powder so obtained was then transferred into a metal rotary bulb (Ni-alloy) and external heating by an electrical split tube furnace was commenced. A constant stream of pure oxygen with a flow rate of 60 Nl/h was applied.

Step (b.2): Then, the powder was heated to 805° C. within 80 minutes and then maintained at that temperature for 300 minutes, followed by rapid external cooling of the bulb in air of ambient temperature by means of opening the split tube furnace. After 0.5 hour of cooling, the temperature dropped to 60° C. The flow of oxygen was maintained until cooling was finished.

An electrode active material of general formula $Li_{(1+x)}(Ni_{0.8}Co_{0.1}Mn_{0.1})_{(1-x)}O_2$ was obtained. The iodine content was 0.7% by weight, determined by combustion ion chromatography. It had excellent morphology with no lumps or aggregated particles. Electrochemical performance was excellent.

The invention claimed is:

1. An electrode active material comprising from 0.01% to 1.0% by weight of bromine or iodine, as determined by coulometric titration, and comprising a mixed oxide according to general formula $Li_{1+x}TM_{1-x}O_2$, wherein TM is a combination according to formula (II)

$$(Ni_aCo_bMn_c)_{1-d}M_d \tag{II}$$

with
a ranging from 0.6 to 0.9,
b ranging from 0.05 to 0.2,
c ranging from zero to 0.2, and
d ranging from zero to 0.1,
M is Al, Ti, or Zr, and a+b+c=1, and
x ranging from zero to 0.2,
wherein the bromine or iodine is in an oxidation state of at least +III, and
wherein the electrode active material has an average particle diameter (D50), as measured by light scattering, ranging from 7 µm to 15 µm, and a D99 particle diameter ranging from 30 µm to 40 µm.

2. A lithium ion battery comprising the electrode active material according to claim 1.

3. A process for making an electrode active material for a lithium ion battery, wherein the process comprises:
(a) contacting a mixture of
(A) a precursor of a mixed oxide according to general formula $Li_{1+x}TM_{1-x}O_2$, wherein x ranges from zero to 0.2, and wherein TM is a combination according to formula (II)

$$(Ni_aCo_bMn_c)_{1-d}M_d \tag{II}$$

with
a ranging from 0.6 to 0.9,
b ranging from 0.05 to 0.2,
c ranging from zero to 0.2, and
d ranging from zero to 0.1,
M is Al, Ti Zr, and a+b+c=1, and
(B) at least one lithium compound, with
(C) $Br_2$, $I_2$, or at least one or more compounds are carbon perbromides, carbon periodides, or interhalogen compounds comprising bromine or iodine, and
(b) subjecting the mixture to heat treatment at a temperature ranging from 700° C. to 1000° C.;
wherein the electrode active material is an electrode active material according to claim 1.

4. The process according to claim 3, wherein the mixed oxide is synthesized from a mixture of at least one lithium compound (B) and a precursor (A): wherein the precursor (A) is a mixed metal oxide, a mixed metal hydroxide, or a mixed metal oxyhydroxide of TM.

5. The process according to claim 3, wherein the lithium compound (B) is lithium hydroxide or lithium carbonate.

6. The process according to claim 3, wherein TM is a combination according to formula (II)

$$(Ni_aCo_bMn_c)_{1-d}M_d \tag{II}$$

with
a ranging from 0.6 to 0.9,
b ranging from 0.05 to 0.2,
c ranging from zero to 0.2, and
d ranging from zero to 0.1,
M is Al, Ti, or Zr, and a+b+c=1.

7. The process according to claim 3, wherein in (a) the precursor (A) is treated with $Br_2$, $I_2$, or at least one or more compounds are carbon perbromides, carbon periodides, and interhalogen compounds comprising bromine or iodine (C) in a solution.

8. The process according to claim 3, wherein in (a) the mixture of precursor (A) and lithium compound (B) is treated with $Br_2$, $I_2$, or at least one or more compounds are carbon perbromides, carbon periodides, and interhalogen compounds comprising bromine or iodine (C) in an organic solvent or in a combination of at least two organic solvents followed by removal of the organic solvent(s).

9. The process according to claim 3, wherein (b) is performed under a forced flow of gas.

10. The process according to claim 3, wherein (b) is performed in a roller hearth kiln, a pusher kiln or a rotary hearth kiln.

\* \* \* \* \*